United States Patent [19]

Himmelblau

[11] Patent Number: 5,034,498
[45] Date of Patent: Jul. 23, 1991

[54] METHOD AND APPARATUS FOR PRODUCING WATER-SOLUBLE RESIN AND RESIN PRODUCT MADE BY THAT METHOD

[75] Inventor: Andrew Himmelblau, Lexington, Mass.

[73] Assignee: Biocarbons Corporation, Lexington, Mass.

[21] Appl. No.: 382,232

[22] Filed: Jul. 19, 1989

[51] Int. Cl.$^5$ .............................................. C08G 8/20
[52] U.S. Cl. ...................................... 528/230; 528/1; 524/13; 524/72; 524/73; 524/74; 524/735; 527/103; 527/105; 568/727; 568/762
[58] Field of Search ............... 528/230, 1; 524/13, 524/72, 73, 74, 735; 527/103, 105; 568/727, 762

[56] References Cited

U.S. PATENT DOCUMENTS

| | | | |
|---|---|---|---|
| 3,754,076 | 8/1973 | Cutler | 423/345 |
| 4,233,465 | 11/1980 | Gallivan et al. | 568/727 |
| 4,344,373 | 8/1982 | Ishii et al. | 110/347 |
| 4,433,126 | 2/1984 | Hsu et al. | 527/105 |
| 4,508,886 | 4/1985 | Russell et al. | 528/1 |
| 4,568,362 | 2/1986 | Deglise et al. | 48/209 |
| 4,865,625 | 9/1989 | Mudge et al. | 48/197 R |

OTHER PUBLICATIONS

*Kirk Othmer Enclyclopedia of Chemical Technology*, vol. 17, pp. 384–415 (1982).
ACS Symposium Series No. 385, *Adhesives from Renewable Resources*, chap. 11, pp. 135–151, "Biomass Pyrotysis Oil Feedstocks for Phenolic Adhesives", Chum, Scahill et al, ACS (1989).
*Wood Adhesive Chemistry & Tech.*, A. Pizzi, pp. 246–288, Marcel Dekker, Inc. (1983).
*Phenolic Resins*, Knop & Plats, pp. 91–102, 175–195, Springer-Verlag.

*Primary Examiner*—John Kight, III
*Assistant Examiner*—S. Acquah
*Attorney, Agent, or Firm*—Iandiorio & Dingman

[57] ABSTRACT

A method and apparatus for producing water-soluble resin and a resin product made by that method, the method including the steps of supplying a volume of an acidic pyrolysis oil, raising the pH of the oil above 7.0 to partially polymerize the oil, and heating the partially polymerized oil to encourage further polymerization to form the resin product.

27 Claims, 3 Drawing Sheets

METHOD AND APPARATUS FOR PRODUCING WATER-SOLUBLE RESIN AND RESIN PRODUCT MADE BY THAT METHOD

FIELD OF INVENTION

This invention relates to a method and apparatus for producing water-soluble resin and the resin product made by that method, and more particularly to such a method and apparatus which uses the total fraction of a biomass pyrolysis oil as the feedstock.

BACKGROUND OF INVENTION

There are four major synthetic resins used in the fabrication of most composite wood materials, for example plywood, particle board, wafer board, and glued wood construction products. The resins are used to bond the wood particles, wafers, or plies. The resins in order of volume used are: urea-formaldehyde; phenol-formaldehyde; melamine-formaldehyde; and resorcinol-formaldehyde. Current efforts are underway to produce wood composite adhesives that can be formulated without formaldehyde, which has been declared hazardous, even in the trace amounts found in wood composite products.

The phenol-formaldehyde or phenolic resins are typically polymerized, cross-linked resins synthesized with excess formaldehyde to ensure full polymerization. In use, they are typically sprayed or painted on the wood surfaces as a viscous liquid and cured under heat and pressure to produce a permanently solidified, cross-linked polymer.

There are two types of phenolic resins made; both types use as raw materials phenols and aldehydes, usually pure phenol and formaldehyde. Because phenol is produced primarily from petroleum, its price and availability are linked to that of petroleum. Consequently, phenolic resins are relatively expensive. In addition, the use of formaldehyde creates health and safety concerns. One type of phenolic resin, novolak, is made under acidic conditions; the acid catalyzes the reaction of phenol and formaldehyde to form the cross-linked polymeric resin. The other type of phenolic resin, resol, is made under basic conditions; a small amount of a base is added to the basic phenol to catalyze the reaction of phenol and formaldehyde into the cross-linked, polymeric resin. The catalyst may be precipitated from the product or remain in solution. The viscosity of the raw resin is typically increased to form the adhesive product by removing water and excess formaldehyde under vacuum distillation in order to keep the resin below its cure temperature. Resols are water-soluble resins which thermoset without additional reaction.

Because the price and availability of these synthetic phenolic resins is tied to that of petroleum, in the past decade a number of attempts have been made to produce from natural resources, phenol or phenolic analogs that could be substituted for the petroleum-based phenol in the synthesis of phenolic resins. Much of the work has centered on the use of the lignin waste of the paper pulping process and phenols extracted from biomass pyrolysis oils.

Most research into biomass pyrolysis, however, has been directed at producing charcoal or gas as fuels. In those processes, oil production is typically avoided by burning the gas at a temperature above the oil dew point. In the biomass pyrolysis work in which the pyrolysis oil has been collected as a product, the processes have typically been geared toward maximizing oil production by pyrolyzing the biomass at a relatively low temperature of less than approximately 500° C. in entrained flow and fixed-bed reactors. The resulting oil typically includes an abundance of phenolic ethers; at that temperature alkyl phenolic production is low. In one series of tests, pine sawdust was pyrolyzed at approximately 500° C. in a vortex reactor. The pyrolysis oil was then extracted with ethyl acetate to produce a phenolic-rich fraction comprising only about 25% of the starting oil. That fraction was then used as a phenol substitute in resol production. However, the low yield and expensive separation techniques make that process commercially impractical.

SUMMARY OF INVENTION

It is therefore an object of this invention to provide a method and apparatus for producing water-soluble resin without phenol or phenol derivatives produced from petroleum.

It is a further object of this invention to provide a method and apparatus for producing water-soluble resin which does not require the use of formaldehyde.

It is a further object of this invention to provide a method and apparatus for producing water-soluble resin which can be used as a low-cost alternative to phenol in the production of phenolic resins and adhesives.

It is a further object of this invention to provide such a method and apparatus which produces the resin from any lignocellulosic material, including wood.

It is a further object of this invention to provide such a method and apparatus for producing water-soluble resin from the entire fraction of biomass pyrolysis oil.

It is a further object of this invention to provide such a method and apparatus which does not require separation of phenols from biomass pyrolysis oils.

It is a further object of this invention to provide such a method and apparatus in which resin water removal in adhesive production can be accomplished at atmospheric pressure.

This invention results from the realization that water-soluble phenolic resin can be made from the entire fraction of an acidic biomass pyrolysis oil by raising the oil pH to partially polymerize the oil and then heating the partially polymerized oil to form the resin.

This invention features a method and apparatus for producing water-soluble resin and the resin product made by that method. The method includes the steps of supplying a volume of an acidic pyrolysis oil, raising the pH of the oil above 7.0 to partially polymerize the oil, and heating the partially polymerized oil to encourage further polymerization to form the resin. The pyrolysis oil is preferably biomass pyrolysis oil, which may be produced from lignocellulosic material; a preferred material is wood. The step of supplying a volume of an acidic pyrolysis oil preferably includes pyrolyzing the lignocellulosic material in a reduced-oxygen atmosphere. Preferably, the material is pyrolyzed in a fluidized-bed gasifier for providing the proper operating conditions and also providing the flexibility for changing those conditions as required to handle different feedstock materials and produce pyrolysis oils with desired compositions.

The pyrolysis may take place at from approximately 480° to 760° C. In a preferred embodiment, the fluidized bed is maintained at approximately 525° to 700° C. The gasifier residence time may be from 0.5 to 2.5 seconds, and is preferably approximately 0.5 to 2.0 seconds to produce an alkyl phenolic-rich oil. It is preferred that the reduced oxygen atmosphere include initially some oxygen for partially burning the material to supply at least some of the heat for pyrolysis. That may be accomplished by using less than stoichiometric air for fluidization/pyrolysis.

The method may include the further step of adding an aldehyde after raising the pH to further polymerize the oil. The aldehyde addition may be made after the heating step. Preferably, the aldehyde is formaldehyde. The method may then include the step of heating after aldehyde addition to more fully polymerize the resin product.

In a preferred embodiment, the partially polymerized oil is heated to approximately 70° to 80° C. to allow controlled polymerization. This heating may take place under total reflux to maintain the water fraction essentially constant. In an alternative embodiment, the step of heating the partially polymerized oil includes a first heating step at less than 100° C. and a second heating step at greater than 100° C. to remove water to form a high-viscosity resin.

The oil pH is preferably raised by addition of a basic solution. That solution is preferably a metal hydroxide solution; sodium hydroxide is a strong base useful in raising the pH. To more fully polymerize the oil, the pH is preferably raised to at least 8.0.

This invention also features a method for producing a water-soluble polymerized resin from lignocellulosic material, which may include wood, including the steps of heating a mass of the material in a reduced-oxygen atmosphere to produce an acidic pyrolysis oil, raising the pH of the oil above 7.0 to partially polymerize the oil, and heating the partially polymerized oil to encourage further polymerization to form the resin.

A method for producing a water-soluble polymerized adhesive product according to this invention may be accomplished by supplying a volume of an acidic biomass pyrolysis oil, adding a basic substance to raise the pH above 7.0 to partially polymerize the oil, heating the basic oil to less than its boiling point, and preferably below 100° C., to further polymerize the oil to form a resin product, and heating the resin product to at least 100° C. to remove water and polymerize the resin to form the adhesive product. In a preferred embodiment, the adhesive product is made from a wood feedstock. The second heating step may be done at least partially at atmospheric pressure. Preferably, the step of heating the wood is done in a fluidized-bed gasifier at approximately 525° to 700° C. for approximately 0.5 to 2.0 seconds to produce an alkyl phenolic-rich pyrolysis oil. An aldehyde may be added after the first heating step to ensure the further polymerization.

This invention also features an apparatus for producing a water-soluble polymerized resin product from lignocellulosic material, including means for heating the material in a reduced-oxygen atmosphere to produce an acidic pyrolysis oil, means for adding a basic substance to the oil to raise the pH to at least 7.0 to partially polymerize the oil, and means for heating the basic oil to further polymerize the oil to form the resin product. Further included may be means for heating the resin product to at least 100° C. to remove water and further polymerize and cross-link the product to form an adhesive product. Preferably, means for maintaining the pH of the oil at least at 7.0 as it is heated are included to ensure further polymerization.

The apparatus preferably includes a vessel for holding the material while it is heated. That vessel may be a fluidized-bed gasifier. In that case, the bed is preferably maintained at approximately 480° to 760° C. to produce an alkyl phenolic-rich oil. The means for heating may include means for supplying a counter-current flow of less than stoichiometric air for fluidizing and partially burning the material to at least partially supply the heat for decomposing the material and for reducing the air oxygen content for pyrolysis. The gasifier residence time is preferably 0.5 to 2.5 seconds to produce an alkyl phenolic-rich oil.

DISCLOSURE OF PREFERRED EMBODIMENT

Other objects, features, and advantages will occur from the following description of preferred embodiments and the accompanying drawings, in which.

This invention may be accomplished in a method and apparatus for producing a water-soluble resin and the resin product made by that method. The resin is made from an acidic pyrolysis oil; biomass pyrolysis oil from wood or other lignocellulosic material is preferred. The entire fraction of the oil is made basic by the addition of a basic substance, and the basic oil is heated to less than its initial boiling point to polymerize the oil to form the resin product. An adhesive product may be made from that resin product by a second heating step at greater than 100° C. to remove water to achieve proper handling viscosity, tack and curing time and further polymerize and cross-link the resin to form a water-soluble adhesive product ideally suited for use in the production of composite wood materials. The resin product may also be used as a phenol substitute in the production of phenolic resins or as a low-cost additive to phenolic adhesives.

Figure 1:
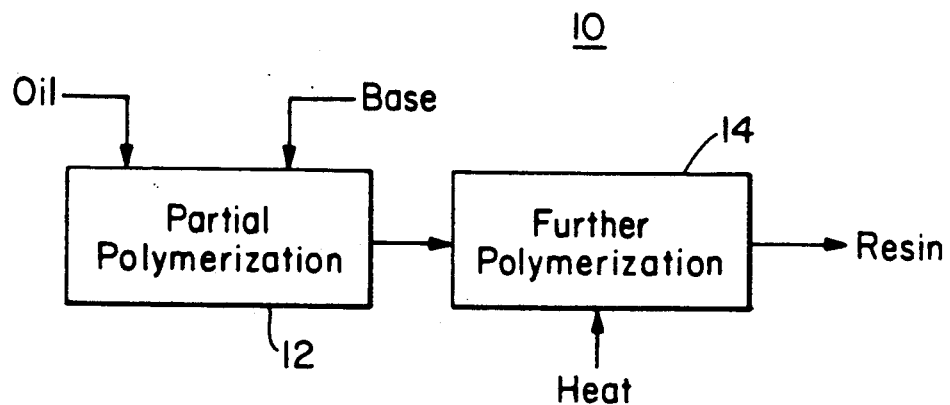
FIG. 1 is a schematic diagram of a method for producing a water-soluble resin according to this invention.

There is shown in FIG. 1 method 10 for producing a water-soluble resin product according to this invention. An acidic pyrolysis oil and a base are mixed, step 12, to partially polymerize the oil. The partially polymerized oil is heated, step 14, to further polymerize the oil to form the resin product. Preferably the heating step takes place at less than the oil initial boiling point.

Figure 2B:
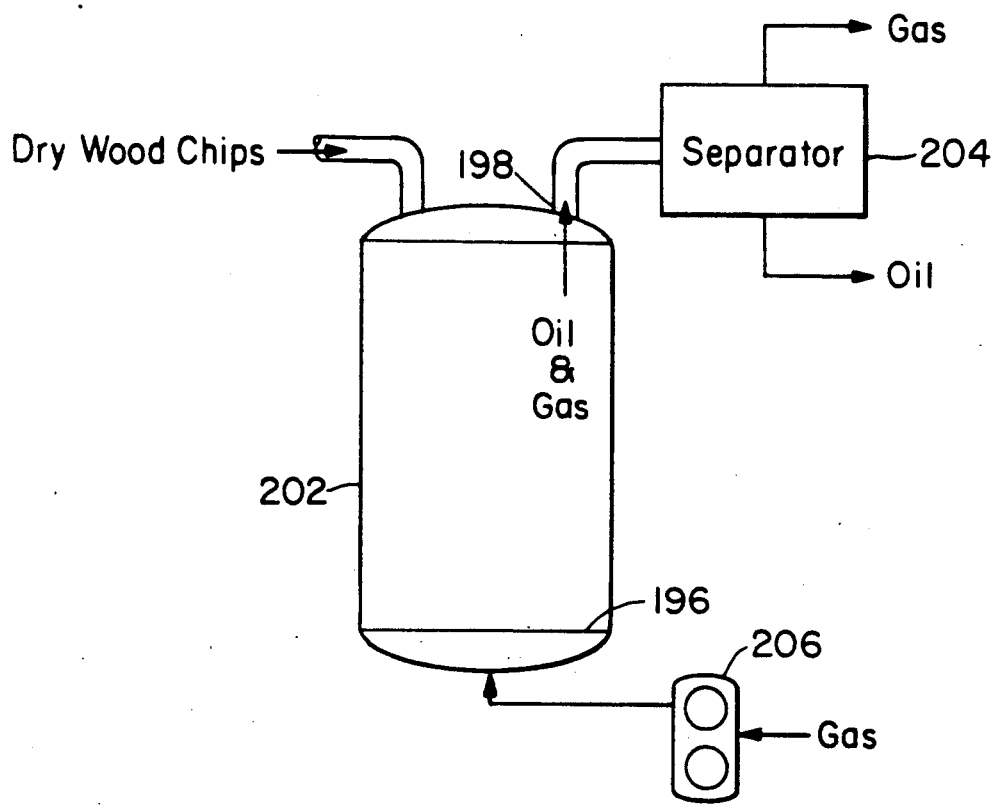
FIG. 2B is a schematic diagram of a fluidized-bed gasifier and gas/oil separator for producing the acidic pyrolysis oil for use as a feedstock in the technique of FIG. 2A.
Figure 2A:
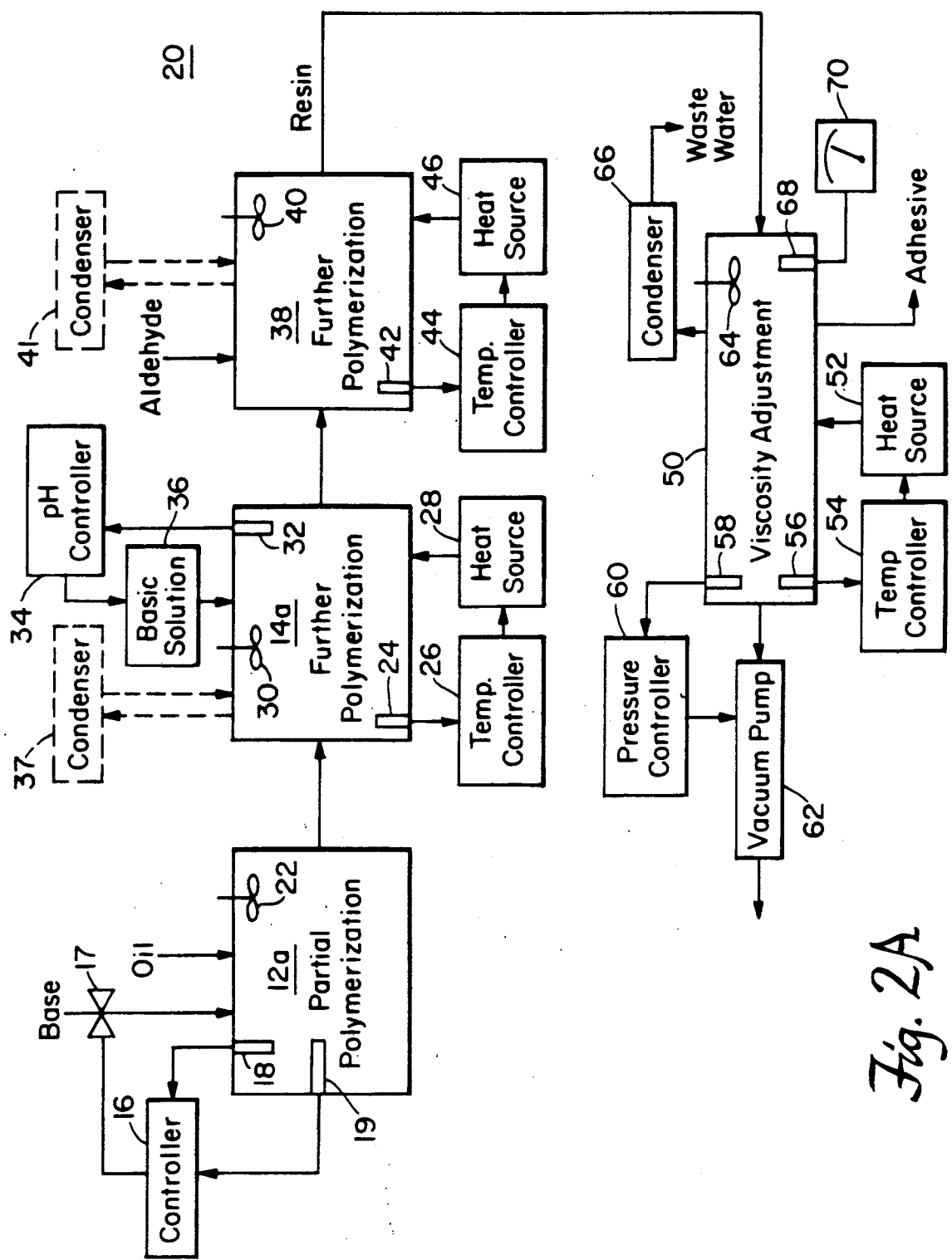
FIG. 2A is a detailed schematic diagram of an alternative technique for producing a water-soluble resin according to this invention.

An alternative technique for producing a water-soluble resin according to this invention is shown in FIG. 2A. Acidic pyrolysis oil and a base are mixed in container 12a to partially polymerize the oil. Controller 16 is responsive to temperature monitor 19 and pH monitor 18 for regulating the base flow through valve 17. Controller 16 meters in the base to keep the temperature of the mixture at a desired level as the pH is raised to above 7.0 to ensure partial polymerization. Stirrer 22 ensures complete mixing.

The pyrolysis oil may be virtually any biomass pyrolysis oil, but is preferably produced from lignocellulosic material. The oil is only slightly water-soluble. Examples of material from which the oil may be made are wood, rice hulls, corn cobs, and other agricultural waste products containing the lignin necessary for forming the resin product. Virtually any basic substance may be used for raising the pH from typical pyrolysis oil values of approximately 3 to 4, to above 7.0. The base may be a substance which may be precipitated from solution after resin synthesis as is known to those skilled in the art. Alternatively, a soluble base remaining in the final product may be employed. Metal hydroxides such as sodium, calcium and barium hydroxides are the preferred class of basic solutions used in raising the pH. As an example, a 50% sodium hyroxide solution may be mixed with the pyrolysis oil in container 12a. The base is added to the oil gradually while stirring until the oil is made basic. Preferably, the pH is raised to at least 8.0 to encourage polymerization, although polymerization will occur at a pH of anywhere between 7 and 14. Above a pH of 9.0, further base addition is relatively ineffective.

Temperature rise from the acid/base and polymerization reactions should be limited by proper metering of the base and/or vessel cooling to keep the temperature of the mixture below the water boiling point to prevent a large water loss or a steam explosion, and maintain a set maximum temperature for quality control purposes. A temperature of from 35° to 125° C. is acceptable for most resins. The basic mixture is readily soluble in water; one part of the mixture should be soluble in approximately three parts of water at room temperature. To accomplish this, approximately one part by weight sodium hydroxide is required per ten parts of dry oil.

After adjusting the pH, further polymerization, step 14a, is realized by heating the partially polymerized oil to a point below its initial boiling point to encourage further polymerization. Preferably, the partially polymerized oil is heated to approximately 70° to 80° C. by heat source 28 controlled by temperature controller 26, which is responsive to temperature probe 24, which may be a thermocouple. As the solution tends to buffer, pH controller 34, responsive to pH sensor 32, may be included for controlling the addition of basic solution 36 to maintain the pH above 7.0 to ensure the continuation of the polymerization. Stirrer 30 is included for ensuring thorough mixing during the heating step.

Polymerization steps 12a and 14a may take place in a single vessel or in separate vessels. Preferably, step 14a takes place under total reflux, as shown by condenser 37 in phantom, for approximately one hour. The heating may then be stopped and the solution cooled to stop the polymerization. There is no need for addition of an acid to return the oil pH to neutral or acidic to stop the reaction.

After step 14a, a sample of the product is preferably tested for adhesive and curing properties by heating to approximately 120° to 130° C. to remove water until the sample is sufficiently viscous for adhesive and curing testing. If the sample has the desired adhesive and curing properties, the further polymerization of step 38 is bypassed and the process proceeds to step 50, in which the viscosity is adjusted by heating the entire batch of resin to remove water. This heating also provides some further polymerization and cross-linking. The viscosity adjustment may be accomplished by heating with heat source 52 controlled by temperature controller 54, which is responsive to thermocouple 56. Stirrer 64 is included for thorough mixing. The heating step may take place at least partially at atmospheric pressure because the resin has a cure temperature of greater than the approximately 120° to 130° C. temperature at which water removal is accomplished. Condenser 66 is used to remove water vapor to increase the resin viscosity. Vacuum pump 62 responsive to pressure controller 60 and pressure sensor 58 may be employed to lower the pressure below atmospheric as needed to allow the water removal to take place at lower temperatures. However, because the resin has a relatively high cure temperature, the thickening may take place at atmospheric pressure, resulting in a substantial energy and equipment savings as compared to the traditional resol production techniques in which the water removal takes place at reduced pressure to keep the resin temperature below 100° C. to prevent excessive polymerization. Viscosity sensor 68 and output device 70 may be included for monitoring the viscosity of the adhesive product.

The resin product from step 14a may be used as an inexpensive substitute for phenol in traditional resol production. Alternatively, if proper adhesive properties are found, the resin may be used as a substitute for or as an extender for resol in composite wood product manufacturing. If the thickened resin sample does not have the desired adhesive properties, further polymerization step 38 may be added before step 50. In step 38, an aldehyde such as formaldehyde as formalin is added to the resin to further polymerize and cross-link the resin. The oil-formalin mixture is stirred by stirrer 40 and heated by heat source 46 responsive to temperature controller 44 and temperature sensor 42 to less than its boiling point and preferably from approximately 70° to 80° C. using total reflux, as shown by condenser 41 in phantom, for a sufficient time to take the polymerization/cross-linking to the desired end point. The resulting resin product may then be tested for adhesive properties as described above before viscosity adjustment, step 50.

The formalin or aldehyde addition in step 38 may be based on the measured or assumed phenolic content of the raw oil. For a pyrolysis oil made from a wood feedstock, the phenolic groups useful in cross-linking may make up approximately 25% of the dry raw oil. In step 38, preferably at least 150% of stoichiometric formaldehyde is added to ensure polymerization and cross-linking.

The adhesive properties of the product produced by the process of this invention are directly related to the chemical composition of the starting pyrolysis oil. The pyrolysis oil may be from any lignin-bearing component; because of its availability and cost, wood and wood by-products are ideal lignin sources for producing the pyrolysis oil. In making pyrolysis oil from biomass, the reaction temperature and time are critical factors in determining the chemical makeup of the oil. At reaction temperatures of up to approximately 480° C., the oil includes primarily mixed oxygenates and phenolic ethers, which have few reactive sites for resin production. As a result, although oil volume is greater at these low temperatures, the pyrolysis oil is not well suited for polymerization and cross-linking. Above approximately 760° C., the oil yield is extremely low. In addition, there are few oxygenated components; the major constituents would be polyaromatic hydrocarbons, which could not be polymerized to form a phenolic resin.

Reaction time also affects the final product; the reaction time should be long enough to decompose the biomass to form gas, vaporized oil and char. It is important to establish a reaction temperature and time which provide a large oil fraction of alkyl phenolics, which have the available sites for polymerization and cross-linking. With a dried wood chip feedstock having a moisture content of approximately 15–20%, a temperature of from 480° to 760° C. and a reaction time of 0.5 to 2.5 seconds will provide a reasonable oil volume having enough alkyl phenolic content to ensure polymerization on addition of the basic substance. At a fixed temperature, excessive reaction time will allow secondary reaction of the vaporized oil.

An apparatus for providing the proper reaction conditions is shown in FIG. 2B. Fluidized bed gasifier 202 is fed from the top with dried wood chips, and countercurrent fluidizing gas from the bottom through blower 206. Any gas having less than stoichiometric oxygen, the amount needed for complete wood combustion, may be used as the fluidizing/heating medium. Preferably, about 20% of stoichiometric air is supplied by blower 206 to fluidize the bed and react the wood chips. A start-up burner, not shown, is included for bringing the bed temperature up to the ignition temperature of the chips. The wood chips are rapidly heated in the bed and decompose/gasify. The bed is made deep enough to allow some of the char to burn as it circulates down into the lower part of the bed, to reduce the oxygen content and to supply the heat for maintaining the bed at its operating temperature. Preferably, the bed operates at from 525° to 700° C. and the residence time, defined by the average gas velocity from bed bottom 196 to gasifier exit 198, is 0.5 to 2.0 seconds for providing a large volume of alkyl phenolic-rich pyrolysis oil.

By a using fluidized-bed gasifier as a reaction vessel, the operating temperature and residence time may be controlled as desired. For a fixed residence time and throughput established by the air flow from blower 206, the bed operating temperature is established by the wood feed rate. The control flexibility allows the process to be adapted for different biomass feedstocks with varying composition and also for the creation of a variety of decomposition products.

Figure 3:
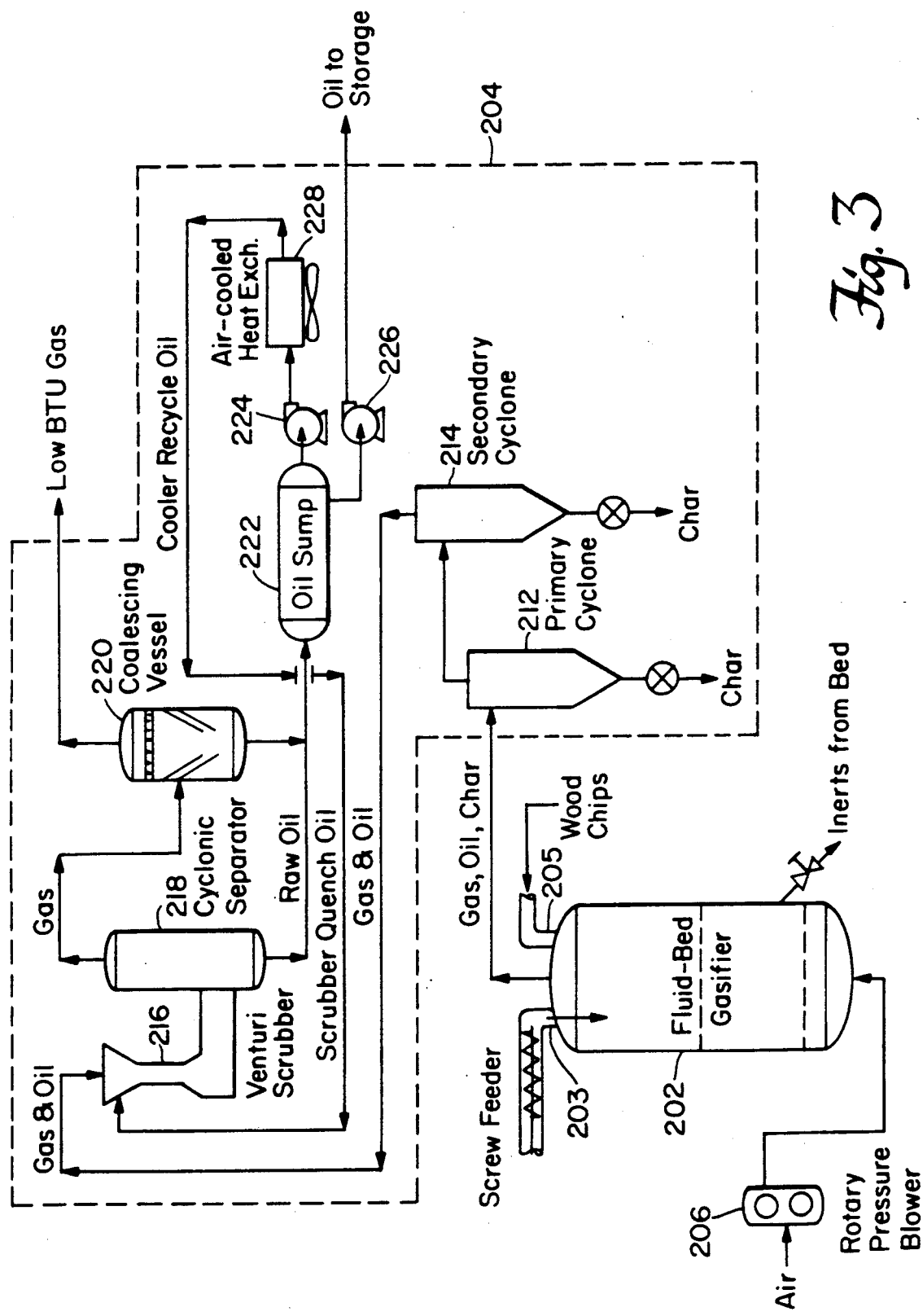
FIG. 3 is a detailed schematic diagram of the separator of FIG. 2B.

The oil and gas along with small char particles are carried out of reactor 202 into separator 204, where the oil is separated from the gas and char. Separator 204 is shown in more detail in FIG. 3, in which fluidized-bed gasifier 202 is fed with dried wood chips at approximately 17.5% moisture content through dual feed ducts 203 and 205. Rotary pressure blower 206 supplies less than stoichiometric air for fluidizing the bed and partially combusting the wood chips and char product to maintain the bed temperature. The blower rate may be set as desired to provide the proper residence time. The wood chips decompose and gasify to form gas, vaporized oil and small char particles which are blown out of the top of gasifier 202. The larger char particles circulate through the bed and burn to supply heat and reduce pyrolysis gas oxygen content. Entrained char is removed by primary and secondary cyclones 212 and 214, respectively.

The gas and oil from cyclone 214 are passed to venturi scrubber 216, usually operated above the water dew point. Scrubber 216 may employ water as the start-up scrubbing medium. The gas and condensed oil are separated in cyclonic separator 218. Additional oil mist removal is accomplished in low-velocity coalescing vessel 220. The condensed oil flows to sump 222, from which a recycle stream is pumped by pump 224 through heat exchanger 228 and sprayed back into scrubber 216 as the scrubbing medium. The net oil product is pumped by pump 226 to a storage tank. The gas fraction heating value may be controlled by control of the operating temperature of gasifier 202, as well as the operating temperature of scrubber 216.

The method and apparatus of this invention provide a phenol-substitute, polymerized resin product and a water-soluble adhesive product useful as a substitute for resol adhesives in composite wood product manufacturing. The starting materials are simply an agricultural waste or wood feedstock and an inexpensive basic substance such as sodium hydroxide. Expensive petroleum-derived phenol or phenolic fraction separation from pyrolysis oil are avoided. As well, formaldehyde is not needed, at least in the resin product production. Thus, this invention provides the means of making a low-cost resin/adhesive from waste products and wood sources with an extremely simple process not requiring the expensive, pure starting materials, and avoiding the need for large amounts of hazardous formaldehyde.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method for producing a water-soluble polymerized resin product, comprising the steps of:
   thermally decomposing lignocellulosic material by means of partial oxidation to produce an acidic, alkyl-phenolic-rich, water-insoluble oil;
   raising the pH of the oil above 7.0 to partially polymerize the oil; and
   heating the partially polymerized oil to further polymerize the oil to form the resin product.

2. The method of claim 1 in which said material is thermally decomposed by partial oxidation in a fluidized bed gasifier.

3. The method of claim 2 in which the fluidized bed is maintained at approximately 480° to 760° C. to produce an alkyl phenolic-rich oil.

4. The method of claim 2 in which the gasifier residence time is approximately 0.5 to 2.5 seconds to produce an alkyl phenolic-rich oil.

5. The method of claim 4 in which said atmosphere is less-than-stoichiometric air.

6. The method of claim 1 in which the lignocellulosic material includes wood.

7. The method of claim 1 including the step of adding an aldehyde after raising the pH to further polymerize the oil.

8. The method of claim 7 in which the aldehyde is added after the heating step.

9. The method of claim 8 further including the step of heating the partially polymerized oil and aldehyde mixture to more fully polymerize the resin product.

10. The method of claim 7 in which the aldehyde is formaldehyde.

11. The method of claim 1 in which the pH is raised to at least 8.0 to more fully polymerize the oil.

12. The method of claim 1 in which the partially polymerized oil is heated to approximately 70° to 80° C. to prevent excess polymerization.

13. The method of claim 12 in which the heating takes place under total reflux to maintain the water fraction essentially constant.

14. The method of claim 1 in which the oil pH is raised by addition of a basic solution.

15. The method of claim 14 in which said basic solution is a metal hydroxide solution.

16. The method of claim 15 in which said metal hydroxide is sodium hydroxide.

17. The method of claim 1 in which the step of heating the partially polymerized oil includes a first heating step at less than 100°C. and a second heating step at greater than 100° C. to remove water to form a high-viscosity resin.

18. The resin product produced by the method of claim 1.

19. A method for producing a water-soluble polymerized adhesive product from a lignocellulosic feedstock, comprising the steps of:
heating a mass of lignocellulosic material in a reduced oxygen atmosphere to produce an acidic pyrolysis oil;
adding a basic substance to the oil to raise the pH to at least 7.0 to partially polymerize the oil;
heating the basic oil to less than approximately 100° C. under reflux to further polymerize the oil to form a resin product;
maintaining the pH of the oil at least at 7.0 during the heating step to maintain the further polymerization; and
heating the resin product to at least 100° C. to form the adhesive by reducing the water content, encouraging cross-linking and increasing the viscosity of the resin product.

20. The method of claim 19 in which the second heating step is done at least partially at atmospheric pressure.

21. The method of claim 19 in which the step of heating the material is done in a fluidized-bed gasifier at approximately 525° to 700° C. for approximately 0.5 to 2.0 seconds to produce an alkyl phenolic-rich pyrolysis oil.

22. The method of claim 19 in which said material includes wood.

23. The method of claim 19 including the step of adding an aldehyde after the first heating step to ensure the further polymerization.

24. A method for producing a water-soluble polymerized resin from lignocellulosic material, comprising the steps of:
heating a mass of the material in a reduced oxygen atmosphere to produce an acidic pyrolysis oil;
raising the pH of the oil above 7.0 to partially polymerize the oil; and
heating the partially polymerized oil to encourage further polymerization to form the resin.

25. The method of claim 24 in which said material includes wood.

26. A method of producing a water-soluble polymerized adhesive product, comprising the steps of:
thermally decomposing lignocellulosic material by means of partial oxidation to produce an acidic, alkyl-phenolic rich, water-insoluble oil;
adding a basic substance to the oil to raise the pH above 7.0 to partially polymerize the oil;
heating the basic oil to less than its boiling point to further polymerize the oil to form a resin product; and
heating the resin product to at least 100° C. to remove water and polymerize the resin product to form the adhesive product.

27. The method of claim 1 in which the step of thermally decomposing lignocellulosic material includes supplying an oxygen-containing atmosphere to the lignocellulosic material to partially burn said material for supplying at least some of the heat for thermal decomposition.

* * * * *